United States Patent
Chen et al.

(10) Patent No.: US 8,199,816 B2
(45) Date of Patent: Jun. 12, 2012

(54) METHOD AND APPARATUS FOR ENCODING ENHANCEMENT LAYER VIDEO DATA

(75) Inventors: Ying Chen, Beijing (CN); Jiefu Zhai, Plainsboro, NJ (US); Peng Yin, West Windsor, NJ (US); Purvin Bibhas Pandit, Franklin Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1284 days.

(21) Appl. No.: 11/887,811

(22) PCT Filed: Mar. 20, 2006

(86) PCT No.: PCT/EP2006/060873
§ 371 (c)(1),
(2), (4) Date: Oct. 3, 2007

(87) PCT Pub. No.: WO2006/106039
PCT Pub. Date: Oct. 12, 2006

(65) Prior Publication Data
US 2009/0285299 A1 Nov. 19, 2009

(30) Foreign Application Priority Data
Apr. 6, 2005 (EP) .................................... 05300253

(51) Int. Cl.
*H04N 11/02* (2006.01)
*H04N 7/12* (2006.01)

(52) U.S. Cl. .............................. 375/240.12; 375/240.24

(58) Field of Classification Search ........................ None
See application file for complete search history.

(56) References Cited

U.S. PATENT DOCUMENTS

| | | | |
|---|---|---|---|
| 6,427,027 B1 * | 7/2002 | Suzuki et al. ................. | 382/236 |
| 2006/0176957 A1 * | 8/2006 | Han et al. ................. | 375/240.16 |
| 2006/0193388 A1 * | 8/2006 | Woods et al. ............. | 375/240.16 |
| 2007/0025628 A1 * | 2/2007 | Sekiguchi et al. ............ | 382/239 |
| 2008/0069203 A1 * | 3/2008 | Karczewicz et al. .... | 375/240.01 |
| 2009/0168872 A1 * | 7/2009 | Jeon et al. ................. | 375/240.12 |
| 2010/0208799 A1 * | 8/2010 | Park et al. ................ | 375/240.08 |

OTHER PUBLICATIONS

J. Reichel et al.: "Joint Scalable Video Model JSVM 0", Joint Video Team (JVT) of ISO/IEC MPEG & ITU-T VCEG (ISO/IEC JTC1/SC29/WG11 and ITU-T SG16 Q6), Jan. 17, 2005, pp. 1-73 XP002345849.
Search Report Dated Jun. 2, 2006.

* cited by examiner

*Primary Examiner* — Clemence Han
(74) *Attorney, Agent, or Firm* — Tutunjian & Bitetto, P.C.

(57) ABSTRACT

A method for improving the performance of the BLSkip mode in SVC includes the steps of upsampling the motion field of the base layer, interpolating the motion vectors for the intra MBs, interpolating the 8×8 block motion field to a 4×4 block motion field, and generating a MV predictor for a 4×4 block in BLSkip mode using neighbor candidates.

10 Claims, 2 Drawing Sheets

METHOD AND APPARATUS FOR ENCODING ENHANCEMENT LAYER VIDEO DATA

This application claims the benefit, under 35 U.S.C. §365 of International Application PCT/EP2006/060873, filed Mar. 20, 2006, which was published in accordance with PCT Article 21(2) on Oct. 12, 2006 in English and which claims the benefit of European patent application No. 05300253.1, filed Apr. 6, 2005.

FIELD OF THE INVENTION

This invention relates to a method for encoding video data.

BACKGROUND

The H.264/AVC standard provides excellent coding efficiency but it does not consider scalable video coding (SVC). SVC may provide different layers, usually a base layer (BL) and an enhancement layer (EL). To give more functionality for the video codec, the Motion Picture Expert Group (MPEG) considered providing a standard for SVC. Various techniques were proposed, and the Joint Video Team (JVT) finally started a standard called JSVC, with a corresponding reference software description called JSVM. SVC provides temporal, SNR and spatial scalability for applications. The base layer of JSVM is compatible with H.264, and most components of H.264 are used in JSVM as specified, so that only few components need to be adjusted according to the subband structure. Among all the scalabilities, spatial scalability is the most challenging and interesting topic, since it is hard to use the redundancy between the two spatial scalable layers.

SVC provides several techniques for spatial scalability, such as IntraBL mode, residual prediction or BLSkip (base layer skip) mode. These modes can be selected on macroblock (MB) level.

IntraBL mode uses the upsampled reconstructed BL picture to predict a MB in the EL, and only encodes the residual. Residual prediction tries to reduce the energy of the motion compensation (MC) residual of the EL by subtracting the upsampled MC residual of the BL.

BLSkip mode utilizes the upsampled MV for a MB in the EL and requires only the residual to be written into the bit stream if a MB selects this mode. Thus, the BLSkip mode makes use of the redundancy between the MVs of a BL and its EL in the spatial scalability case.

In the JSVM of SVC, BLSkip modes are used for MBs of inter coded predicted (P) frames and inter coded bi-predicted (B) frame. A BL MV, which will be usually stored for each 4×4 block, will be upsampled by multiplication with two. Then the upsampled MV will correspond to an 8×8 block of the higher resolution EL. That is, if the QCIF (176×144) BL frame has (11×9) MBs and each MB has sixteen 4×4 blocks, there are 11×9×16 MVs in the BL (if there is no intra MB). When a selected MV is (h,v) and its corresponding 4×4 block has the start coordinates (x,y), then the upsampled MV is (h*2,v*2) and the corresponding 8×8 block in the high resolution frame (CIF: 352×288) is (2*x,2*y). Thus, four 4×4 blocks with start coordinates of (2x,2y), (2x+4, 2y), (2x,2y+4) and (2x+4,2y+4) will be assigned the same MV of (2h,2v).

Then during the mode decision process, when BLSkip is the current candidate, the MB (if it has the start coordinate of 2x,2y) will set the MVs by using actually four MVs. For the four 8×8 subblocks, four MVs are set for the current MB, which have the corresponding start coordinates of (2x,2y), (2x+8,2y), (2x,2y+8) and (2x+8,2y+8).

SUMMARY OF THE INVENTION

The MV structure mode for the described MB is actually MODE_8×8, which means that the difference of the MV will be specified in the depth of resolution 8×8 rather than 4×4.

The above-described structure means that the MC process for each 8×8 blocks can be handled by using four MVs. However, these 4 MVs are actually the same. Using this mode, the MVs are not used to be coded, since during the decode process they can also be predicted in the same way. So it saves some bits if the predictor is somewhat similar to the true motion. The above solution used by SVC is simple and of low complexity. However, the upsampled MV is not very accurate because of two reasons. One is that the MV have only ½ pixel accuracy, but the mostly used MV for MC have ¼ pixel accuracy; another is that for each 8×8 block, its four 4×4 subblocks use the same MV, which might also be not accurate enough from the resolution point of view.

The problem to be solved by the invention is therefore to improve the accuracy for predicted MVs, particularly for the BLSkip mode.

The present invention gives better motion field upsampling and interpolation methods for spatial scalability so as to improve the coding efficiency of the inter pictures of SVC.

The present invention first smoothes and interpolates the motion field constructed by 8×8 MVs to a better granularity motion field constructed by 4×4 MVs, and then during the prediction process uses scalar median, vector median and average methods to select a better predictor for the BLSkip mode. As a result, the disclosed MV prediction technique achieves improved coding efficiency, particularly for the BLSkip mode in SVC JSVM 1.0.

According to the invention, a method for encoding higher layer video data includes the steps of
upsampling the motion field of the base layer,
interpolating the motion vectors for the intra coded macroblocks,
interpolating the 8×8 block motion field to a 4×4 block motion field, and
generating in base layer skip mode a motion vector predictor for a 4×4 block, wherein motion vectors from neighbor blocks are used.

Further according to the invention, an apparatus for encoding higher layer video data includes
means for upsampling the motion field of the base layer,
means for interpolating the motion vectors for the intra coded macroblocks,
means for interpolating the 8×8 block motion field to a 4×4 block motion field, and
means for generating in base layer skip mode a motion vector predictor for a 4×4 block, wherein motion vectors from neighbor blocks are used.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in
FIG. 1 8×8 MV interpolation for Intra MB.

DETAILED DESCRIPTION OF THE INVENTION

Figure 1:
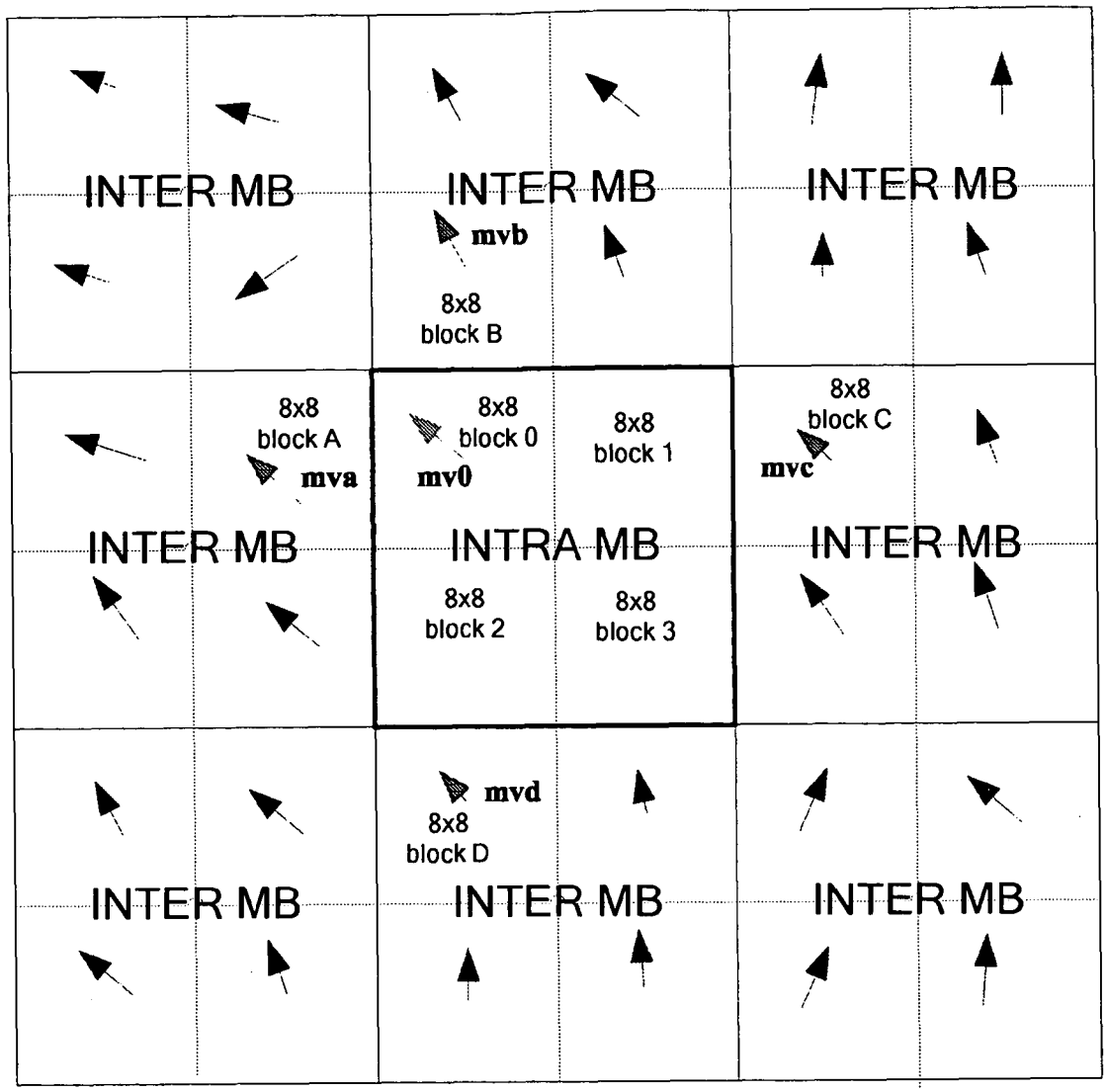

Currently, only the MV upsampled from the co-located MV of the base layer (low resolution layer) is used as a predictor for the enhancement layer (high resolution layer), the accuracy of the upsampled MV is low (usually ½ pixel accuracy if we use ¼ pixel accuracy in our motion estimation (ME) process). And the MV partition is only for 8×8 block. That is, every 4 4×4 block of an 8×8 block will share the same MV. Our invention focus on improving the accuracy of the MV, especially for the BLSkip mode by first using motion field smoothing technique and then give more MVs as predictor for a current MB to determine it will choose the BLSkip mode or not. Given a better predictor (predictors) for the BLSkip mode, which has a high percentage for the MBs in a picture, we can improve the coding efficiency.

In order to achieve more coding efficiency, this invention improves the BLSkip mode by giving a better MV predictor for a MB that selects BLSkip mode. To get a more accurate MV that will be closer to the true motion, we first utilize several methods to smooth the motion field of the BL, and then utilize strategies to choose the MV for a MB of the EL from the motion field as well as from the neighboring MVs from the current layer.

A motion field is defined in a 2D area P as following: $MV(P) \subset N^2$, where D is a set of lattice pixels and N is the integer field.

Because the default MV accuracy is quarter (¼) pixel, each MV mv(p) actually is a product of 4 and the replacement of the ME.

For the upsampled motion field from the BL, we can look on it as a function defined in the area P made up of by 8×8 lattice pixels. So P is $\{(P_x, P_y) | P_x = 8x, P_y = 8y, \text{ for any } 0 \leq x < 22, \text{ and } 0 \leq y < 18\}$. Here, the upper bound of x and y is actually determined by the width and height of the resolution of the frame after upsampling: width/8 and height/8.

Actually if a MB is intra, it has no MV, so there is no definition of the MV(P) for the corresponding four values in P. So we first give definitions for those values in P by interpolation then using the neighboring MVs.

When we have a definition for any value in the 8×8 lattice definition area of P, we will construct another motion field: $MV(P4) \subset N^2$, where the function is defined in the area of 4×4 lattice pixels.

1. Define the Motion Field in the Intra Area

In H.264/AVC, even inter pictures (P or B) have intra MBs. In SVC, the same features are kept. So, at the first step, we give definitions for the lattices that correspond to the intra MBs.

A possible solution is to use bilinear interpolation to get the 8×8 MVs for an intra MB. The first step is to find for an 8×8 block in an Intra MB from each direction the nearest 8×8 blocks that do not belong to Intra MB.

If the start coordinate of the 16×16 MB is (x,y), then the so-called nearest MVs have the following coordinates if the nearby (neighboring) MBs are Inter MBs:
Block 0: A(x−8,y), B(x,y−8), C(x+16,y), D(x,y+16)
Block 1: A(x−8,y), B(x+8,y−8), C(x+16,y), D(x+8,y+16)
Block 2: A(x−8,y+8), B(x,y−8), C(x+16,y+8), D(x,y+16)
Block 3: A(x−8,y+8), B(x,y−8), C(x+16,y+8), D(x+8,y+16)

In FIG. 1, the four nearest MVs in different directions (mva, mvb, mvc, mvd) are used to interpolate the MV of block 0 (mv0).

Actually, in the upsampled motion field, four Intra MBs will appear the same time, since a 16×16 Intra MB (whether it is INTRA_16×16 or INTRA_4×4) will turn to a 32×32 block, which can be divided into four 16×16 Intra MBs. If a nearby MB is still Intra coded, the inventive method continues searching in the same direction until encountering an Inter MB, and then uses it. After we get the four 8×8 blocks, we can carry on the MV interpolation process.

We define the distance of two blocks to be calculated by $Dist(P_A - P_B) = |x_a - x_b| + |y_a - y_b|$, where $P_A$ and $P_B$ are the start coordinate of the 8×8 blocks.

E.g. the nearest 8×8 blocks for block 0 in FIG. 1 are blocks A, B, C, D. And the distance from 0 to A, B, C, D respectively are $D_a = 8$, $D_b = 8$, $D_c = 16$, $D_d = 16$. The interpolated MV in block 0 is calculated by:

$$mv_0 = ((D_c \cdot mv_a + D_a \cdot mv_c)/(D_a + D_c) + (D_d \cdot mv_b + D_b \cdot mv_d)/(D_b + D_d))/2$$

2. Smooth and Interpolate the 8×8 Motion Field to 4×4 Motion Field

Figure 2:
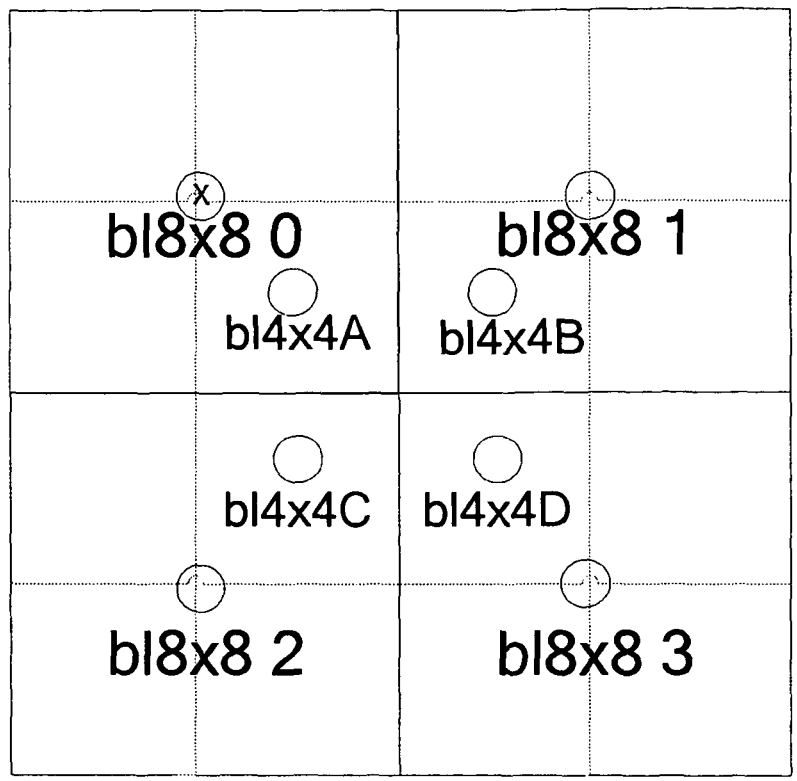
FIG. 2 bilinear interpolation for MVs of 4×4 block.

Now, the motion field is defined in any pixel of the 8×8 lattice. The next step is to create a motion field defined in a 4×4 lattice. One possible solution is illustrated in FIG. 2. E.g. the weight for the 4×4 block A (b14×4A) is 9/16, 3/16, 3/16, 1/16 regarding the 8×8 blocks 0, 1, 2, 3 (b18×8 0 . . . 3) respectively.

Figure 3:
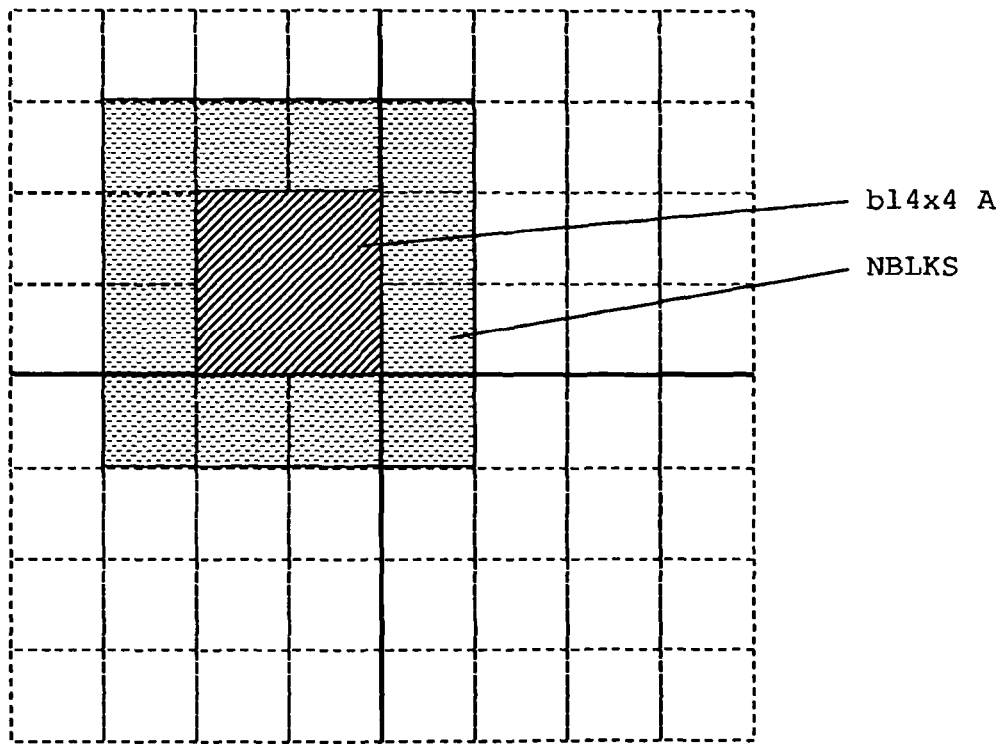
FIG. 3 relevant blocks for bilinear interpolation of 4×4 block.

In other words, the weight or impact of an 8×8 block on a 4×4 block depends on the number of its 2×2 subblocks that are included or direct neighbours to the 4×4 block. These are 9 from b18×8_0, 3 from b18×8_1 and b18×8_2 each and 1 from b18×8_3, as shown in FIG. 3 corresponding to FIG. 2.

For each central point of a 4×4 block, there are four nearest central points of the 8×8 blocks, which contain a MV ($mv_a$, $mv_b$, $mv_c$, $mv_d$). The MV of a 4×4 block is interpolated by the following formula:

$$mv = \sum_{i=0}^{3} mv_i \cdot weight_v \cdot weight_h$$

where subscript x is A, B, C, D as shown in FIG. 2. There are two weights for each predictor MV in the formula.

$$Weight_v = (x_p - x_0)/(x_1 - x_0)$$

$$Weight_h = (y_p - y_0)/(y_4 - y_0)$$

Other solutions are also available for interpolation and smoothing of the motion field.

3. Motion Vector Prediction for the BLSkip Mode

When during the mode decision process the current mode candidate is BLSkip, the motion compensation mode will be set as MODE_4×4, because the BL motion field is actually based on 4×4 lattices.

A simple solution is to utilize as the MV for the BLSkip mode for each 4×4 block of a MB the co-located MV of the 4×4 block of the upsampled motion field.

Another solution is to use the neighboring MVs to predict the MV for the current 4×4 block. The candidates can be MVs of the four blocks (left 4×4 block, above 4×4 block, down 4×4 block and right 4×4 block) or those of the eight blocks (by adding left above 4×4 block, left down 4×4 block, right above 4×4 block and right down 4×4 block).

For the certain candidate MVs, several methods can be used to get the predictor: Average the candidates, Scalar Median the candidates or Vector Median the candidates.

Average means that the horizontal value and the vertical value of the MV are generated by averaging the respective horizontal or vertical values of the candidates.

Scalar Median is also generated by getting the median of horizontal values and vertical values respectively. To get the median value of several values, a simple solution is to sort the values first and get the value in the sorted list using the median index.

The Vector Median method gets out the MV that has the smallest sum of distance from others. So the solution of the following equation is the vector median MV.

$$mv_{VM} = \underset{mv_i}{\arg\min}\left(\sum_{i \neq j} Dist(mv_i, mv_j)\right)$$

For low pass pictures, or if the reference frame is far from the current frame, the Average method will give better results. If the distance of the two frames is close, Median or Vector Median method will be better. One adaptive MV prediction strategy is to utilize the Average method for low pass frames, and utilize the Median or the Vector Median method for high pass frames.

In principle, the inventive method for improving the performance of the BLSkip mode in SVC includes the following steps:
  upsampling the motion field of the base layer;
  interpolating the motion vectors for the intra MBs;
  interpolating the 8×8 block motion field to a 4×4 block motion field;
  generating a MV predictor for a 4×4 block in BLSkip mode using neighbor candidates.

An apparatus for improving the performance of the BLSkip mode in SVC according to the invention has:
  means for upsampling the motion field of the base layer;
  means for interpolating the motion vectors for the intra MBs;
  means for interpolating the 8×8 block motion field to a 4×4 block motion field; and
  means for generating a MV predictor for a 4×4 block in BLSkip mode from neighbour candidates.

In one embodiment of the invention, MVs from the four nearest 8×8 blocks of different directions are used to predict the 8×8 blocks in Intra MBs.

In one embodiment of the invention, bilinear interpolation is used to interpolate the 8×8 motion field to a 4×4 motion field.

In one embodiment, a selection strategy, e.g. Average, Median and Vector Median, is used to get the MV from the neighboring MV candidates.

In one embodiment, an adaptive MV selection strategy is used that takes into account the distance between the current frame and the reference frame: if the distance is short, Median or Vector Median is preferred, otherwise the Average.

In short, JSVM used the upsampled BL MV as the MV for the higher resolution layer for the BLSkip mode. However the upsampled MV is not good enough and can be improved. All the upsampled MVs are actually half pixel accuracy and each four 4×4 blocks in an 8×8 block share the same MV. In the present invention, we provide method and apparatus to give better motion vector for the BLSkip mode.

The core of the invention is the following: In order to achieve more coding efficiency, this invention improves the BLSkip mode by giving better MV predictor for a MB that selects a BLSkip mode. To get a more accurate MV that will be closer to the true motion, we first utilize several methods to smooth the motion field of the BL, and then utilize strategies to choose the MV for a MB of the EL from the motion field as well as from the neighboring MVs from the current layer.

The main advantage of the present invention is that the coding efficiency of inter coded pictures of SVC is improved, which is achieved by better motion field upsampling and adaptive interpolation methods.

The invention claimed is:

1. A method for predicting motion vectors for encoding enhancement layer video data, the method comprising the steps of
  upsampling a motion field of a base layer; assigning the motion vectors of the upsampled motion field to 16×16 macroblocks of an enhancement layer;
  generating motion vectors for 8×8 blocks from the motion vectors of 16×16 macroblocks, wherein the motion vectors for intra coded 8×8 blocks are interpolated from the motion vectors of four nearest inter coded 8×8 blocks;
  interpolating motion vectors of 4×4 blocks from the motion vectors of the 8×8 blocks; and
  performing an encoding mode decision; wherein for base layer skip mode, said 4×4 motion vectors are used as predictors.

2. The method according to claim 1, wherein for said generating the motion vectors of intra coded 8×8, blocks a bilinear interpolation is used.

3. The method according to claim 2, wherein the bilinear interpolation considers the distance from a current 8×8 block to the four nearest inter coded 8×8 blocks according to $$mv_0 = ((D_c \cdot mv_a + D_a \cdot mv_c)/(D_a + D_c) + (D_d \cdot mv_b + D_b \cdot mv_d)/(D_b + D_d))/2,$$

wherein $mv_0$ is a motion vector, a,b,c and d are indices of the four nearest inter coded 8×8 blocks, $mv_a$, $mv_b$, $mv_c$ and $mv_d$ are motion vectors of the four nearest inter coded 8×8 blocks, and $D_a$, $D_b$, $D_c$, and $D_d$ are distances of the four nearest inter coded 8×8 blocks.

4. The method according to claim 1, wherein for said interpolating motion vectors of 4×4 blocks, only motion vectors of 8×8 blocks of a current 16×16 macroblock are used.

5. The method according to claim 4, wherein said interpolating motion vectors of 4×4 blocks comprises assigning weights to the motion vectors of 8×8 blocks of the current 16×16 macroblock, wherein the weight assigned to a motion vector of an 8×8 block depends on the number of its 2×2 subblocks that are direct neighbours to a current 4×4 block or included in a current 4×4 block.

6. An apparatus for predicting motion vectors for encoding enhancement layer video data, the apparatus comprising:
  upsampling means for upsampling a motion field of a base layer;
  means for assigning the motion vectors of the upsampled motion field to 16×16 macroblocks of an enhancement layer;
  means for generating motion vectors for 8×8 blocks from the motion vectors of 16×16 macroblocks, wherein the motion vectors for intra coded 8×8 blocks are interpolated from the motion vectors of four nearest inter coded 8×8 blocks;
  interpolation means for interpolating motion vectors of 4×4 blocks from the motion vectors of the 8×8 blocks; and
  means for performing an encoding mode decision, wherein for base layer skip mode, said 4×4 motion vectors are used as predictors.

7. The apparatus according to claim 6, wherein for said generating the motion vectors of intra coded 8×8 blocks, a bilinear interpolation is used.

8. The apparatus according to claim 7, wherein the bilinear interpolation considers the distance from a current 8×8 block to the four nearest inter coded 8×8 blocks according to $$mv_0=((D_c \cdot mv_a+D_a \cdot mv_c)/(D_a+D_c)+(D_d \cdot mv_b+D_b \cdot mv_d)/(D_b+D_d))/2,$$

wherein $mv_0$ is a motion vector, a,b,c and d are indices of the four nearest inter coded 8×8 blocks, $mv_a$, $mv_b$, $mv_c$ and $mv_d$ are motion vectors of the four nearest inter coded 8×8 blocks, and $D_a$, $D_b$, $D_c$ and $D_d$ are distances of the four nearest inter coded 8×8 blocks.

9. The apparatus according to claim 6, wherein for said interpolating motion vectors of 4×4 blocks, only motion vectors of 8×8 blocks of a current 16×16 macroblock are used.

10. The apparatus according to claim 9, wherein said interpolating motion vectors of 4×4 blocks comprises assigning weights to the motion vectors of 8×8 blocks of the current 16×16 macroblock, wherein the weight assigned to a motion vector of an 8×8 block depends on the number of its 2×2 subblocks that are direct neighbours to a current 4×4 block or included in a current 4×4 block.

\* \* \* \* \*